United States Patent [19]

Horstman

[11] 4,111,291

[45] Sep. 5, 1978

[54] CENTRIFUGAL FRICTION MECHANISM

[75] Inventor: Gilbert F. Horstman, Arcadia, Calif.

[73] Assignee: Horstman Manufacturing Co., Inc., Monrovia, Calif.

[21] Appl. No.: 806,764

[22] Filed: Jun. 15, 1977

[51] Int. Cl.² ............................................. F16D 43/06
[52] U.S. Cl. .............................. 192/105 C; 192/70.28
[58] Field of Search ......... 192/105 C, 105 B, 105 CP, 192/103 A, 105 CS, 70.26, 70.28

[56] References Cited

U.S. PATENT DOCUMENTS

| 1,995,406 | 3/1935 | Tower | 192/105 C |
| 2,232,454 | 2/1941 | Haupt | 192/105 C |
| 2,287,631 | 6/1942 | Miller | 192/70.26 |
| 2,529,014 | 11/1950 | Goldberg et al. | 192/105 C X |
| 3,001,623 | 9/1961 | Fawick | 192/105 B |
| 3,291,274 | 12/1966 | Wyman | 192/105 C |

Primary Examiner—Benjamin W. Wyche
Attorney, Agent, or Firm—Fulwider, Patton, Rieber, Lee & Utecht

[57] ABSTRACT

A centrifugal clutch having at least one input plate and at least one output disk concentric with the plate. At a predetermined speed of input rotation, the plates and disks are forced to move axially into frictional engagement by weights that pivot in response to centrifugal force. Pivoting of the weights is restrained by axially oriented springs, and the speed of engagement can be varied by adjusting the spring force. The springs are accessible for adjustment without disassembling the clutch.

16 Claims, 9 Drawing Figures

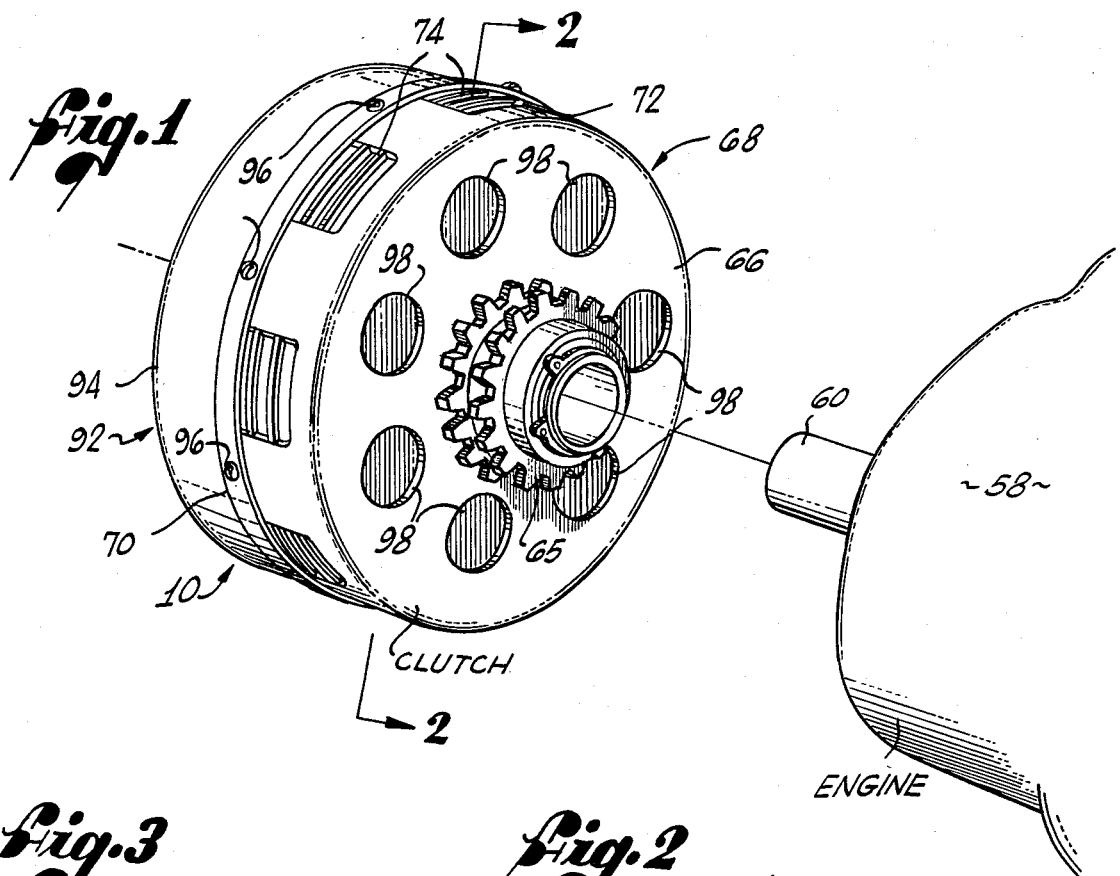
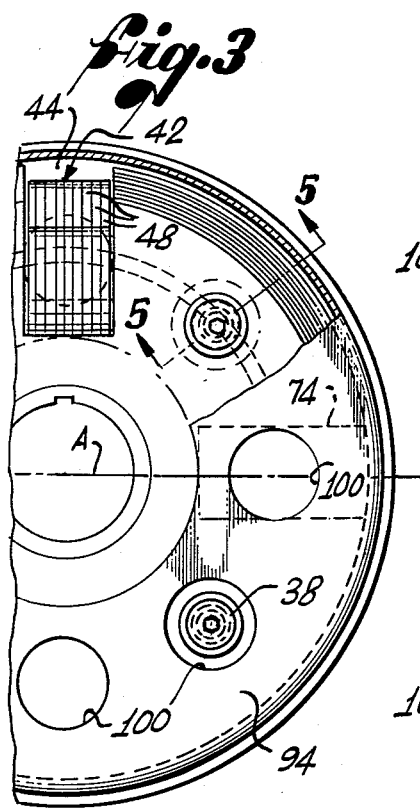
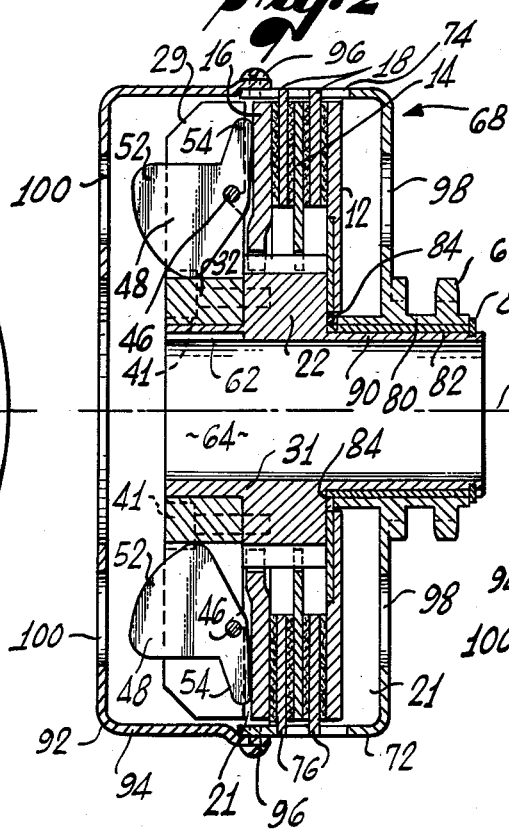
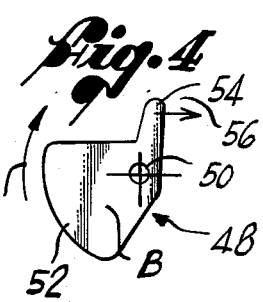
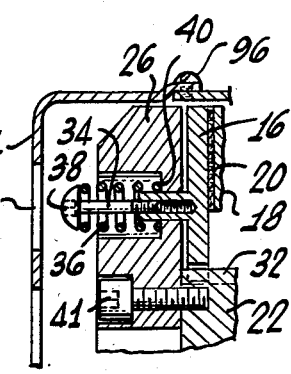

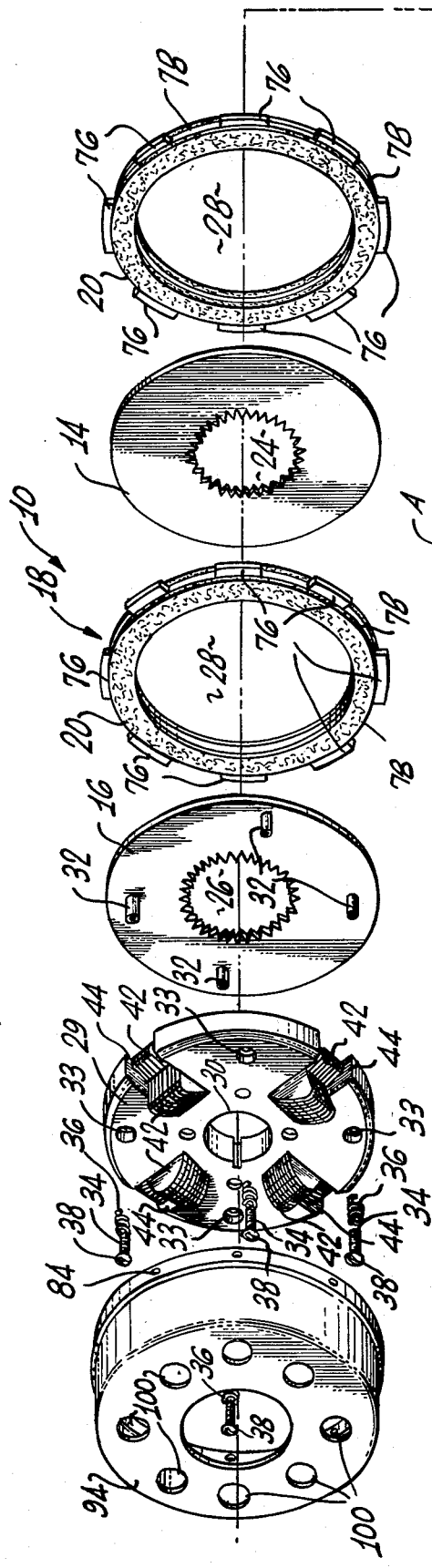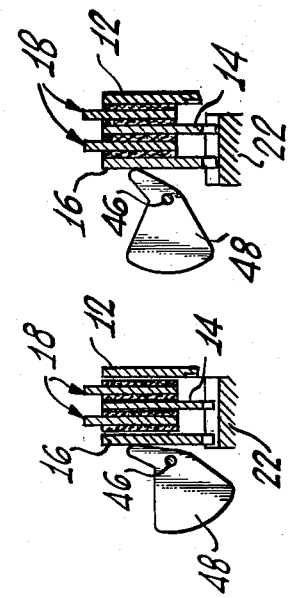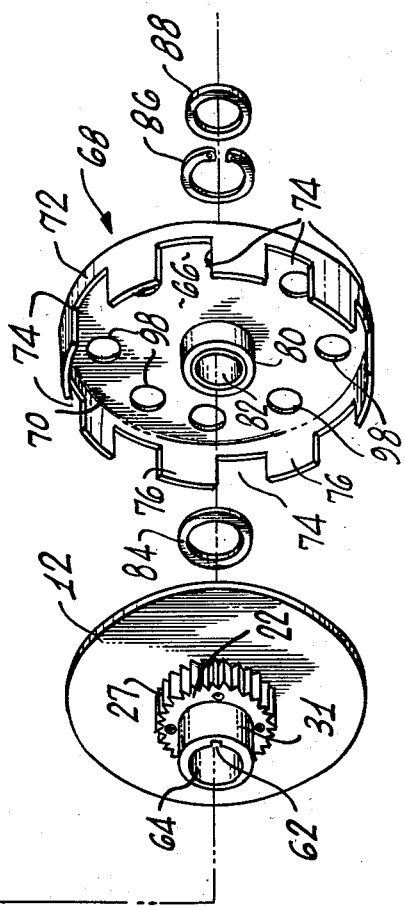

CENTRIFUGAL FRICTION MECHANISM

BACKGROUND OF THE INVENTION

The present invention relates to friction clutches, and more particularly to friction clutches in which engagement occurs at a predetermined speed in response to centrifugal force.

Friction clutches that engage at a predetermined speed have been known for some time and are particularly useful in combination with motors, such as internal combustion engines, that are not capable of starting under load conditions. The engine is permitted to accelerate freely with the clutch disengaged until it reaches the point on its power curve where it produces sufficient torque. At this predetermined speed, the clutch automatically engages and applies the load.

Previously known centrifugal friction clutches have exhibited a number of important shortcomings. Many are large and heavy, thus limiting the types of equipment on which they can be used. Some engage too abruptly or unevenly, causing the engine speed to fall. The engagement speed is usually not readily adjustable, and if adjustment is possible, disassembly of the mechanism and substitution of parts is often required. Another disadvantage of many previously known clutches is a tendency of the friction surfaces to remain engaged once engagement is commenced, resulting in a speed of disengagement substantially lower than the speed of engagement. If stalling on deceleration is to be avoided, the speed of engagement must be higher than otherwise desired to compensate for this effect.

An application of centrifugal friction clutches that is particularly demanding is the connection of a small displacement internal combustion engine to the drive wheel of a go-cart. These vehicles are not equipped with transmissions, and it is necessary to continuously engage and disengage the clutch as the cart enters straight-aways and turns. The clutch must be compact and light-weight, it must engage smoothly and always at the same speed, and the speeds of engagement and disengagement should be as close to each other as possible. Ease of adjustment of the speed of engagement is particularly important since the characteristics of different tracks dictate different optimum settings, and the best setting for an individual cart and driver must be determined by trial and error. The clutches presently used for this purpose must be disassembled for each readjustment, and their range of adjustment is relatively small.

SUMMARY OF THE INVENTION

The present invention provides an improved centrifugal friction clutch that overcomes many of the disadvantages of previously known clutches of this type. It employs one or more clutch plates arranged parallel to one or more concentric clutch disks. The plates rotate with an input connector and a support member, while the disks rotate with an output connector. Frictional engagement of the disks with the plates to drive the output connector is caused by a pressure mechanism carried by the rotating support member. The pressure mechanism includes one or more weights, each pivotable about an axis perpendicular to the rotational axis of the plates. Upon rotation of the support member, centrifugal force causes the weights to pivot, so that cam surfaces on the weights produce the necessary axial movement between the plates and disks.

Preferably, resilient members such as coil springs restrain pivotal movement of the weights and insure positive disengagement of the clutch. The speed of engagement can be adjusted by varying the spring force. A particularly advantageous arrangement utilizes stems that project axially from one of the plates and screws projecting through the support member are received by the stems. The springs are compressed between the screw-heads and the support members to urge the end plate toward the support member to loosen the plate-disk stack.

A clutch housing can be provided with one or more apertures through which the position of the screws can be adjusted without disassembly. The housing interlocks the plates and rotates with them, and the output connector is carried by the housing.

Other features and advantages of the present invention will become apparent from the following detailed description taken in conjunction with the accompanying drawings which illustrate, by way of example, the principles of the invention.

BRIEF DESCRIPTION OF THE DRAWINGS

FIG. 1 is a perspective view of an exemplary centrifugal friction dry clutch constructed according to the principles of the invention, and an engine arranged for connection with the clutch;

FIG. 2 is an enlarged cross-sectional view of the clutch taken along the line 2—2 of FIG. 1;

FIG. 3 is an enlarged, partially broken-away plane view of the clutch;

FIG. 4 is an enlarged plane view of a weight used in the clutch;

FIG. 5 is an enlarged fragmentary view of the clutch taken along the line 5—5 of FIG. 3;

FIG. 6 is an exploded view of the clutch;

FIGS. 7 and 8 are schematic drawings of the pressure mechanism of the clutch.

DESCRIPTION OF THE PREFERRED EMBODIMENT

Figure 9:
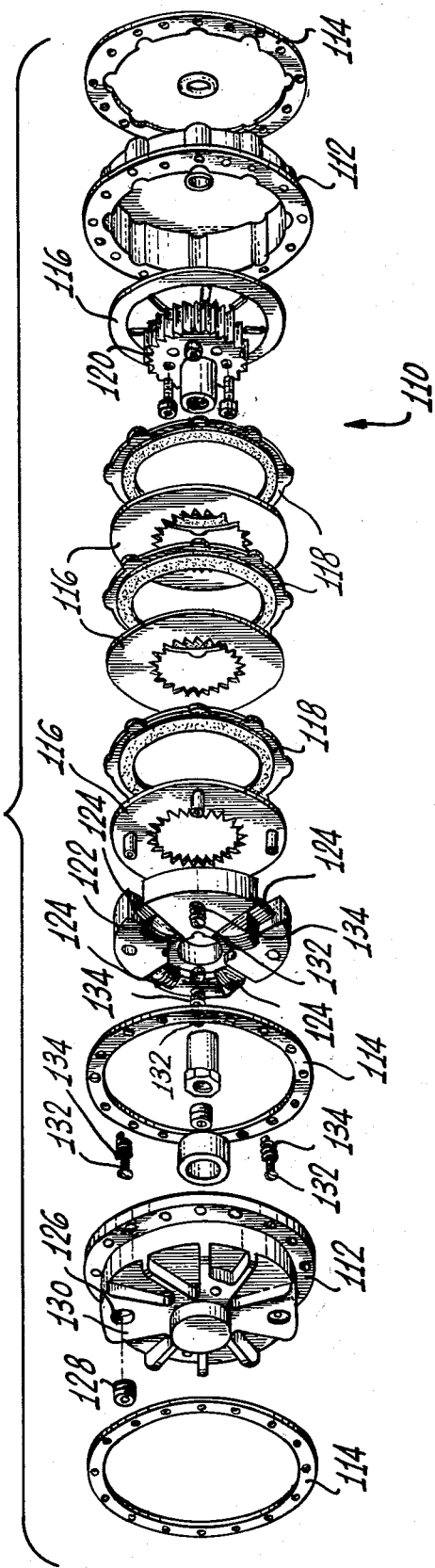
FIG. 9 is an exploded view of a wet clutch also constructed according to the principles of the invention.

An exemplary centrifugal friction clutch 10 embodying many novel features of the present invention is depicted in FIGS. 1 - 8 of the accompanying drawings. It is particularly suitable for use in go-cart racing.

As best seen in FIGS. 2 and 6, the clutch 10 includes a series of three concentric clutch plates, 12, 14 and 16 and two concentric clutch disks 18 interleaved between the plates. Friction linings 20 are attached to both faces of each disk 18 to prevent relative rotation when sufficient axial pressure is applied to the plate-disk stack 21. One of the end plates 12 carries a splined hub 22, with the other plates 14 and 16 having centered openings 24 and 26, respectively, that are toothed about their peripheries to engage the splines 27 so that all of the plates must rotate in unison. The disks 18 have central openings 28 of larger diameter than the hub 22 so that they are free to rotate independently of the plates 12, 14 and 16 when they are not frictionally engaged.

A cast aluminum support member 29 having a circular outline and a diameter approximately equal to that of the disks 12, 14 and 16 and the plates 18 has a central opening 30 so that it fits over an unsplined end portion 31 of the hub 22 that has a reduced diameter. The last disk 16, which is adjacent the support member 29, carries four symmetrically spaced, integrally formed, stems 32 that extend through apertures 33 in the support member, thereby rotationally connecting the support member to the disks 12, 14 and 16. The stems 32 are internally threaded to receive axially projecting screws 34. Coil springs 36 encircle the screws 34 and are compressed between the screw-heads 38 and annular countersunk surfaces 40 that surround the apertures 33. The springs 36 therefore pull the adjacent plate 16 toward the support member 29, urging that plate toward a position where there is ample space between the two end plates 12 and 16 to permit the plates 12, 14 and 16 to rotate independently of the disks 18. Accordingly, the springs 36 bias the clutch 10 toward a disengaged condition. The support member 29 is fixed in position with respect to the most distant plate 12 by screws 41 that are threaded into the hub 22, thereby limiting the axial travel of the other plates 14 and 16 and the disks 18 when the clutch 10 is disengaged.

Engagement of the clutch 10 in response to centrifugal force is caused by a pressure mechanism consisting of four sets of weights 42, each of which is disposed within a slot 44 of rectangular outline. The slots 46 are radially oriented and symmetrically arranged about the periphery of the support member 29, as shown in FIGS. 2 and 3. A pin 46 extends across each slot 44 in a direction perpendicular to the rotational axis "A" of the disk-plate stack 21, and the corresponding set of weights 42 is pivotable on that pin.

Each set of weights 42 is made up of a plurality of flat parallel stampings or leaves 48 perpendicular to the pin 46. When viewed from the side, as shown in FIG. 4, each of the weight stampings 48 presents an aperture 50 in which the pin 46 is received. It has an enlarged drive portion 52 disposed radially inwardly from the pin 46 and an elongated cam portion 54 extending radially outwardly from the pin 46. The center of gravity "B" of the drive portion 52 is axially spaced outwardly from the pin 46 away from the adjacent plates 12, 14 and 16.

When the disks 12, 14 and 16 and the support member 29 are rotated, centrifugal force tends to throw the drive portions 52 radially outwardly, as indicated by the arrow "C" in FIG. 4, pivoting the weights 42 so that cam surfaces 56 on the portions 54 push the adjacent disk 16 away from the support member 29. Thus, the weights move from their rest position, shown in FIG. 7, to their pressure applying position, shown in FIG. 8.

The axial movement of the adjacent disk 16 is restrained by the springs 36, but at a predetermined rotational speed the combined force of the four sets of weights 42 can compress the springs 36 sufficiently to cause frictional engagement between the opposing surfaces of the disk-plate stack 21. The resilience of the springs 36 results in smooth engagement with minimum loss of engine speed on imposition of a load and substantially eliminates random variations in engagement speed that have characterized some previously known centrifugal clutches. The springs 36 also tend to equalize the speed of engagement with the speed of disengagement to permit more efficient use of the engine power curve.

Input power is supplied to the clutch 10 by an engine 58 having a power take-off shaft 60, shown in FIG. 1. An input connection for the shaft 60 is formed by a keyway 62 in an axial bore 64 that extends through the hub 22. An output connection for the clutch 10 takes the form of a sprocket 65 for a chain drive, suitable for use with a gocart, attached to the flat closed end 66 fo a shallow drum 68. The opposite end 70 of the drum 68 is open to slide over the plate-disk stack 21. Generally cylindrical sides 72 of the drum 68 are provided with axially oriented rectangular slots 74 which receive a plurality of lugs 76 that project radially from each of the disks 18, thereby interlocking the disks with the drum and connecting the disks together for joint rotation. The circumferential edges 78 of the disks 18 between the lugs 76 are received snugly within the sides 72 of the drum 68 to prevent radial movement of the disks.

On the inner surface of closed end 66 of the drum 68 is a sleeve 80 that is separated from the nearest disk 12 by a spacer 84. A cylindrical bearing member 82 is affixed to the inner surface of the sleeve 80. A snap ring 86, followed by another spacer 88, positions the drum 68 on an axial projection 90 of the disk 18 that extends through the sleeve 80.

The drum 68 forms one half of a two-piece housing 92, the second half being a shallow cover 94 that fits over the support member 29 and is secured to the drum 68 by a plurality of screws 96. Cooling of the clutch 10 is effected through round ventilating apertures 98 and 100 arranged in circles on the ends of the drum 68 and cover 94, respectively.

It should be noted that the speed at which the weights 42 overcome the restraining force of the springs 36 can be adjusted by simply turning the adjustment screws 34 to vary their axial position. The screws 34 are readily accessible through the apertures 100 in the cover 94 without disassembling the clutch 10, this accessibility making fine adjustment of the engagement speed by trial and error a simple task. Moreover, adjustments of greater magnitude can be made by substitution of springs having a different spring rate, again utilizing the apertures 100 which are of larger diameter than the springs 36. The entire clutch 10 is of simple easily disassembled construction which permits the friction linings 20 to be inspected frequently and replaced with a minimum of time and skill when necessary. The number of components is kept to a minimum and there is no wasted space within the mechanism.

The clutch 10 described above is a dry clutch, but many aspects of the invention are also embodied in an exemplary wet clutch 110 shown in FIG. 9. It differs from the dry clutch 10 primarily with respect to the housing 112 which is sealed against oil leakage by three ring-shaped gaskets 114. Its operation and construction are similar to that of the dry clutch 10, utilizing four plates 116 and three interleaving disks 118. One of the plates 116 carries a spline 120 by which the four plates are locked together for joint rotation. The disks 118 interlock with the housing 112 for rotation therewith. Upon rotation of the plates 116, an interconnected weight support 122 causes a plurality of weights 124 to revolve and pivot, thereby translating centrifugal force into an axial force that presses the plates 116 and the disks 118 together to engage the clutch.

There are, of course, no ventilation apertures in the oil-tight housing 112. However, an aperture 126, sealed by a removable plug 128, is provided on one end 130 of the housing 112 for access to a plurality of screws 132 that are used to adjust the tension on a plurality of coil springs 134 that restrain pivotal movement of the weights 124. Only one such aperture 126 is required since it can be rotated into alignment with each of the screws 132 in succession.

While two particular forms of the invention have been illustrated and described, it will be apparent that various modifications can be made without departing from the spirit and scope of the invention.

I claim:

1. A centrifugal friction clutch comprising:
   a plurality of concentric clutch plates;
   a plurality of clutch disks interleaved between said plates, said disks being concentric with said plates;
   a hub extending axially through said plates and disks connecting said plates for joint rotation;
   a generally cylindrical drum surrounding said plates and disks and concentric therewith, said drum interlocking the peripheral edges of said disks, whereby said disks and said drum are interconnected for joint rotation;
   a weight support member concentric with said plates and disks having a plurality of apertures therein;
   a plurality of threaded stems projecting axially from one of said plates through said apertures in said weight support member, whereby said weight support member is connected to said plates for rotation therewith;
   means for causing said plates to frictionally engage said disks comprising a symmetrical array of weights, each pivotably mounted on said weight support member about a pivot axis substantially perpendicular to the rotational axis of said weight support member, each of said weights having a drive portion disposed radially inwardly from its pivot axis and a cam portion extending radially outwardly from its pivot axis, said drive portion being heavier than said cam portion and having its center of gravity disposed further from said plates than from said pivot axis, whereby said cam portion is urged toward said plates by centrifugal force upon rotation of said weight support member;
   a plurality of threaded members engaged by said stems;
   a plurality of coil springs, each of which encircles one of said threaded members, said springs being compressed between said threaded members and said support member, thereby restraining pivotal movement of said weights to prevent frictional engagement of said plates with said disks below a predetermined speed of rotation of said plates, said predetermined speed being adjustable by turning said threaded member;
   input connector means for supplying rotational power to said plates; and
   output connector means for supplying rotational power from said disks.

2. The centrifugal friction clutch of claim 1, wherein said output connector means comprises a sprocket attached to said drum.

3. The centrifugal friction clutch of claim 1, further comprising a cover attached to said drum, said cover having at least one aperture therein through which said threaded members are accessible to adjust said predetermined speed.

4. The centrifugal friction clutch of claim 3, wherein each of said disks has a plurality of lugs projecting radially therefrom and said drum has a plurality of axial slots therein, said lugs being received within said slots to provide said interlock between said disks and said drum.

5. The centrifugal friction clutch of claim 4, wherein said aperture is of larger diameter than said springs to permit replacement of said springs through said aperture.

6. The centrifugal clutch of claim 1 wherein said threaded members are screws and said stem is threaded internally.

7. A centrifugal friction clutch comprising:
   at least one clutch plate;
   at least one clutch disk adjacent to and engageable with said plate, said disk being concentric with said plate;
   a weight support member concentric with said plate and said disk having a plurality of apertures therein;
   a plurality of threaded stems projecting axially from said plate through said apertures in said weight support member whereby said weight support member is connected to said plate for rotation therewith;
   means for causing said plate to frictionally engage said disk comprising a symmetrical array of weights, each pivotably mounted on said weight support member about a pivot axis substantially perpendicular to the rotational axis of said weight support member, each of said weights having a drive portion and a cam portion, said cam portion being urged toward said plate by centrifugal force upon rotation of said weight support member;
   a plurality of threaded members engaged by said stems; and
   a plurality of coil springs, each of which encircles one of said threaded members, said springs being compressed between said threaded members and said support member, thereby restraining pivotal movement of said weights to prevent frictional engagement of said plate with said disk below a predetermined speed of rotation of said plates, said predetermined speed being adjustable by positioning said threaded members.

8. The centrifugal clutch of claim 7 further comprising a generally cylindrical drum surrounding said plate and disk and concentric therewith, said drum being interlocked with said disk for joint rotation.

9. The centrifugal clutch of claim 8, wherein said drum in interlocked with the peripheral edges of said disk.

10. The centrifugal friction clutch of claim 9 further comprising a sprocket attached to said drum.

11. The centrifugal clutch of claim 9 further comprising a cover connected to said drum for rotation therewith, said cover having at least one aperture therein through which said threaded members are accessible to adjust said predetermined speed.

12. The centrifugal friction clutch of claim 11, wherein said aperture is of larger diameter than said springs to permit replacement of said springs through said aperture.

13. The centrifugal clutch of claim 7 further comprising:
   input connector means for supplying rotational power to said plates; and
   output connector means for supplying rotational power from said disks.

14. A centrifugal friction clutch comprising:
   at least one clutch plate;
   at least one clutch disk adjacent to and engageable with said plate, said disk being concentric with said plate;
   a weight support member concentric with said plate and said disk having a plurality of apertures therein and interlocked with said plate for rotation therewith;
   means for causing said plate to frictionally engage said disk comprising a symmetrical array of weights, each pivotably mounted on said weight support member about a pivot axis substantially perpendicular to the rotational axis of said weight support member, each of said weights having a drive portion and a cam portion, said cam portion being urged toward said disk by centrifugal force upon rotation of said weight support member;

a plurality of threaded members received by said plate;

a plurality of coil springs, each of which encircles one of said threaded members, said springs being compressed between said threaded members and said support member, thereby restraining pivotal movement of said weights to prevent frictional engagement of said plate with said disk below a predetermined speed of rotation of said plate, said predetermined speed being adjustable by turning said threaded members; and a cover connected to said disk for rotation therewith, said cover having at least one aperture therein through which said threaded members are accessible to adjust said predetermined speed.

15. The centrifugal friction clutch of claim 14, wherein said aperture is of larger diameter than said springs to permit replacement of said springs through said aperture.

16. The centrifugal clutch of claim 14 wherein there are a plurality of said apertures arranged to coincide with said threaded member.

* * * * *